UNITED STATES PATENT OFFICE.

ALEXANDER S. RAMAGE, OF DETROIT, MICHIGAN, ASSIGNOR TO BOSTAPH ENGINEERING CORPORATION, OF DETROIT, MICHIGAN, A CORPORATION OF NEW YORK.

PROCESS OF PRODUCING AROMATIC HYDROCARBONS.

1,365,849.  Specification of Letters Patent.  Patented Jan. 18, 1921.

No Drawing.  Application filed June 24, 1918.  Serial No. 241,644.

*To all whom it may concern:*

Be it known that I, ALEXANDER S. RAMAGE, a citizen of the United States, residing at Detroit, in the county of Wayne and State of Michigan, have invented certain new and useful Improvements in Processes of Producing Aromatic Hydrocarbons, of which the following is a specification.

This invention is a process whereby aromatic hydrocarbons, especially such as contain a side chain or group attached to the carbon nucleus, may be directly converted into other aromatic hydrocarbons which are usually simpler in constitution owing to the replacement by hydrogen of one or more of the side chains or groups. The process involves the hydrogenation of the aromatic hydrocarbon at an elevated temperature in presence of a catalyst, which in the preferred embodiment of the invention is a lower oxid of iron, or such mixtures of lower oxids as are prepared by the reduction of ferric oxid.

While the invention is applicable to the treatment of a rather wide range of aromatic hydrocarbons, I will describe it by way of example in its specific application to the transformation of those aromatic bodies which exist in so-called "solvent naphtha", comprising chiefly xylene, its higher homologues, cumene, etc., and closely related bodies. I have found that under suitable conditions it is possible to effect a direct reduction (hydrogenation) of these hydrocarbons, whereby the alkyl group (methyl, ethyl, etc.) is replaced by hydrogen, thereby enriching the nucleus in hydrogen. As a typical example of my process I may refer to the transformation of xylene into toluene, the conversion probably occurring in the manner indicated by the following equation.

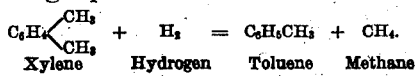

Xylene   Hydrogen   Toluene   Methane

A further transformation of the same general character would involve the conversion of toluene into benzene:

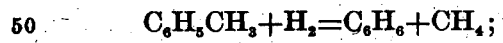

and in the practice of the invention it is usually found that the product consists of a mixture of cyclic hydrocarbons, representing various bodies derived by hydrogenation from the original starting material. In case the material originally treated is solvent naphtha, the cyclic hydrocarbons which predominate in the product are benzene and toluene.

The catalyst which I prefer to use is a lower oxid of iron, or a mixture of such lower oxids, conveniently prepared by heating ferric oxid in a current of hydrogen or other reducing gas while avoiding reduction to metallic iron. Any suitable catalyst for hydrogenation, including nickel, may however be used without departing from my invention.

The invention will now be described by reference to a specific embodiment thereof, it being of course understood that it is not limited to the treatment of the particular raw material mentioned, nor to the manipulative details described, nor to the use of any particular type of apparatus.

*Example.*

The conversion apparatus consisted of an iron pipe approximately twenty feet in length by about three inches in internal diameter. This was mounted at a slight inclination to the horizontal, and was initially filled with granular ferric oxid. Means were provided for heating the pipe and contents to an accurately controlled temperature in the neighborhood of 700° C. for the greater part of its length. The upper portion of the pipe, which in this instance served chiefly as a vaporizing chamber for the entering liquid hydrocarbons, was held at a much lower temperature, approximately 300° C. Heat was applied to the respective portions of the pipe through independently controlled electric resistance circuits. Any suitable method applying the heat may of course be used, or if desired the hydrocarbons may be vaporized in an external retort or still. The apparatus used forms no part of the present invention.

The ferric oxid was first reduced to a lower state of oxidation by passing a current of hydrogen through the heated contents of the pipe. Thereafter solvent naphtha was fed (1 gal. per hr.) directly to the upper end of the pipe and vaporized in contact with the iron oxid therein. The vapors traversed the heated contents of the pipe, and were subjected, at the outlet end, to the appropriate recovery operations including condensation in a refrigerated coil, and scrubbing the exit gases, first with the collected condensate and then with wash oil, such as is used in benzole recovery plants. The scrubbed exit gases were collected in a gasometer. Hydrogen in some excess of the actual reaction requirements was continuously introduced into the reaction pipe. The pressures used were slightly above atmospheric, being sufficient only to secure a regular movement of the gases through the reaction tube and scrubbing system. The temperature in the tube beyond the vaporizing section was held substantially constant throughout the operation, the pyrometer readings in two successive operations being respectively 700° and 730° C. The hydrogen was supplied to the above tube at the rate of approximately .25 pounds per hour.

Under these specific conditions approximately 75% of the original solvent naphtha escaped hydrogenation, and was recovered in the fractionation of the mixed product and returned to the reaction tube for retreatment. The balance, or converted fraction, was found to contain in two successive runs, 36.46 and 33.10% of a light fraction, chiefly benzene, mixed with some low-boiling naphthenes; and 60.15 and 65.37% of toluene. The total recovery in each case was in excess of 95% of the original material. The percentage of material undergoing conversion depends of course primarily upon the length of the tube, or the number of tubes operating in series, and may be increased as desired; in other words, the provision of additional tube length is equivalent from an operating point of view to returning the unconverted fraction to the original tube.

I claim:—

1. Process of treating aromatic bodies containing one or more alkyl groups, comprising replacing an alkyl group by hydrogen, by subjecting the aromatic body to the action of hydrogen at a temperature approximating 700° C., in presence of a catalyst comprising a lower oxid of iron.

2. Process of treating aromatic bodies containing a plurality of alkyl groups, comprising replacing an alkyl group by hydrogen, by subjecting the aromatic body to the action of hydrogen at a temperature approximating 700° C., in presence of a catalyst comprising a lower oxid of iron.

3. Process of preparing toluene from xylene, comprising replacing an alkyl group of xylene by hydrogen, by subjecting xylene to the action of hydrogen at a temperature approximating 700° C., in presence of a catalyst comprising a lower oxid of iron.

In testimony whereof, I affix my signature.

ALEXANDER S. RAMAGE.